AUTOMATIC CHANNEL EQUALIZATION APPARATUS

Filed March 6, 1967 5 Sheets-Sheet 1

INVENTORS.
JOHN B. LORD
DEAN W. LYTLE
BY Bruce C Lutz
ATTORNEY

INVENTORS.
JOHN B. LORD
DEAN W. LYTLE
BY Bruce C Lutz
ATTORNEY

AUTOMATIC CHANNEL EQUALIZATION APPARATUS

INVENTORS.
JOHN B. LORD
DEAN W. LYTLE
BY Bruce C Lutz
ATTORNEY

AUTOMATIC CHANNEL EQUALIZATION APPARATUS

Filed March 6, 1967 5 Sheets-Sheet 4

INVENTORS.
JOHN B. LORD
DEAN W. LYTLE
BY Bruce C. Lutz
ATTORNEY

AUTOMATIC CHANNEL EQUALIZATION APPARATUS

Filed March 6, 1967 5 Sheets-Sheet 5

INVENTORS.
JOHN B. LORD
DEAN W. LYTLE
BY Bruce C Lutz
ATTORNEY

United States Patent Office 3,479,458

Patented Nov. 18, 1969

3,479,458
AUTOMATIC CHANNEL EQUALIZATION APPARATUS

John B. Lord, Edmonds, and Dean W. Lytle, Seattle, Wash., assignors to Honeywell Inc., Minneapolis, Minn., a corporation of Delaware Filed Mar. 6, 1967, Ser. No. 620,993
Int. Cl. H04l *25/02;* G08b *29/00;* H04b *1/00*
U.S. Cl. 178—69 10 Claims

ABSTRACT OF THE DISCLOSURE

Apparatus for and the method of automatically equalizing a data channel while data is being transmitted therethrough. This is accomplished by using the data itself, which is randomized, to adjust the receiving apparatus to reduce or eliminate the degrading effects of channel induced inter-symbol interference upon the reception of multilevel pulse amplitude or pulse code modulation.

This invention relates generally to automatic channel equalization apparatus and more specifically to equalization apparatus which operates continuously and automatically while data is being transmitted through a data link. Equalization as herein used constitutes the adjustment of the receiving apparatus to reduce, or eliminate, the de-grading effects of channel induced inter-symbol interference upon the reception of multiple level pulse amplitude, or pulse code, modulation.

Prior art systems for channel equalization, while in some instances automatic, suffer from two main deficiencies:

(1) The criterion of best equalization, namely the setting of inter-symbol interference to zero within a restricted region about the peak channel impulse response, is sub-optimal compared to the present invention.

(2) The method of control, or of adjustment, in the prior art systems is sufficiently incomplete so that in certain realistic situations the control apparatus does not function properly. The present invention overcomes this objection and will always adjust to best possible terminal conditions for the given situation.

In addition to the above advantages, it is an object of the present invention to provide automatic channel equalization apparatus for continuously changing the equalization in response to changing data link conditions while data is being transmitted.

Other objects and advantages of this invention will be ascertainable from the specification and appended claims along with the drawings wherein:

Figure 2:
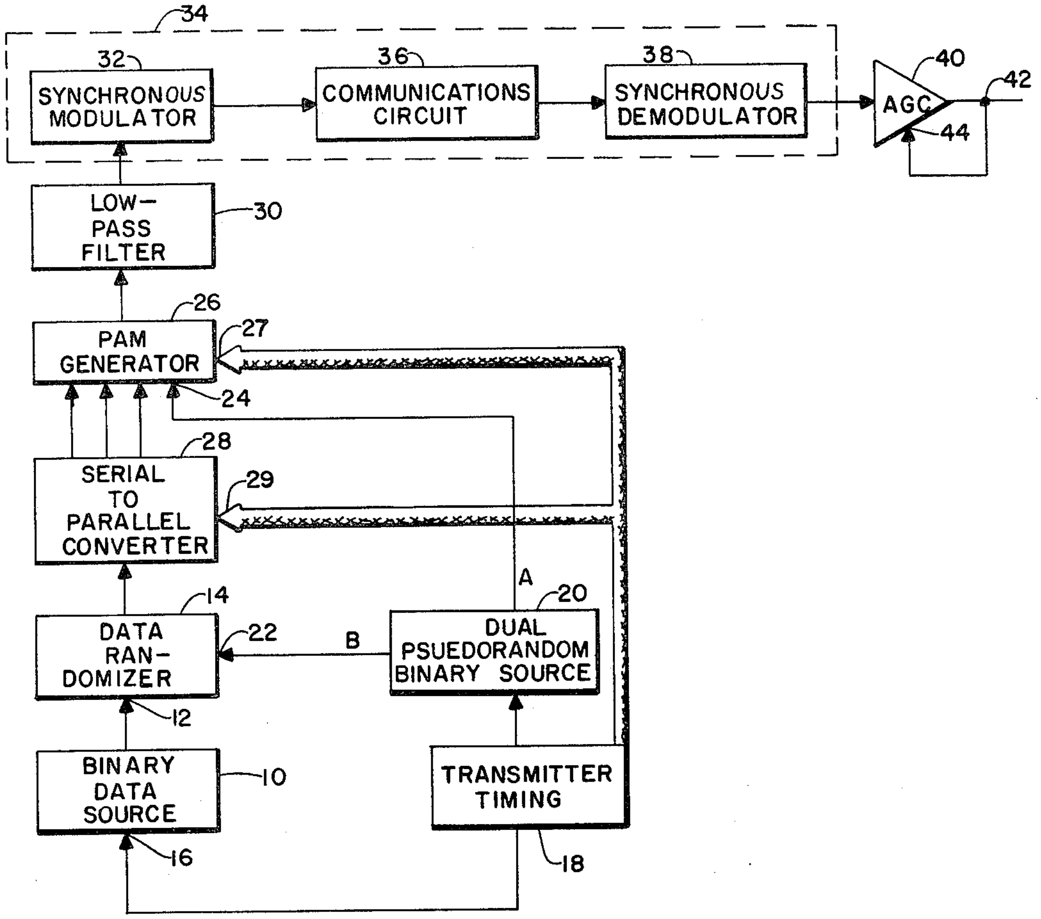
FIGURE 2 illustrates one embodiment of a transmitter and data link for use with the present invention.

Referring first to FIGURE 2, it will be noted that a data source 10 provides an output signal to an input 12 of a data randomizer 14. The data source 10 has an input 16 from a transmitter timing circuit 18. Timing circuit 18 also provides timing information to an input of a dual pseudo-random binary source 20. Dual pseudo-random binary source 20 has a first output on a first or B channel to provide a second input 22 to the data randomizer 14. A second or A output of source 20 is applied to an input 24 of a D/A converter or pulse amplitude modulating (PAM) generator 26. A serial to parallel converter 28 is connected between the data randomizer

14 and the generator 26 to provide parallel inputs to the generator 26. The transmitter timing circuit 18 also provides timing inputs to the PAM generator 26 at an input 27 and to converter 28 at input 29. The PAM generator 26 provides a random, non-return to zero output through a low pass filter 30 to a synchronous modulator 32 which is part of a data link generally designated as 34 and including in addition a communication circuit 36 and a synchronous demodulator circuit 38. The output of the synchronous modulator is passed through the communications circuit 36 and to the synchronous demodulator 38. An output of the synchronous demodulator 38 is applied to an input of an automatic gain control amplifier circuit 40 which has an output 42. The output signal appearing at output 42 is fed back to a gain control input 44 on the gain control amplifier 40. The apparatus of FIGURE 1 does not need an absolutely constant input from the automatic gain control circuit 40 and could function without this unit in many instances. However, for completeness of disclosure, this circuit has been shown.

Figure 1:
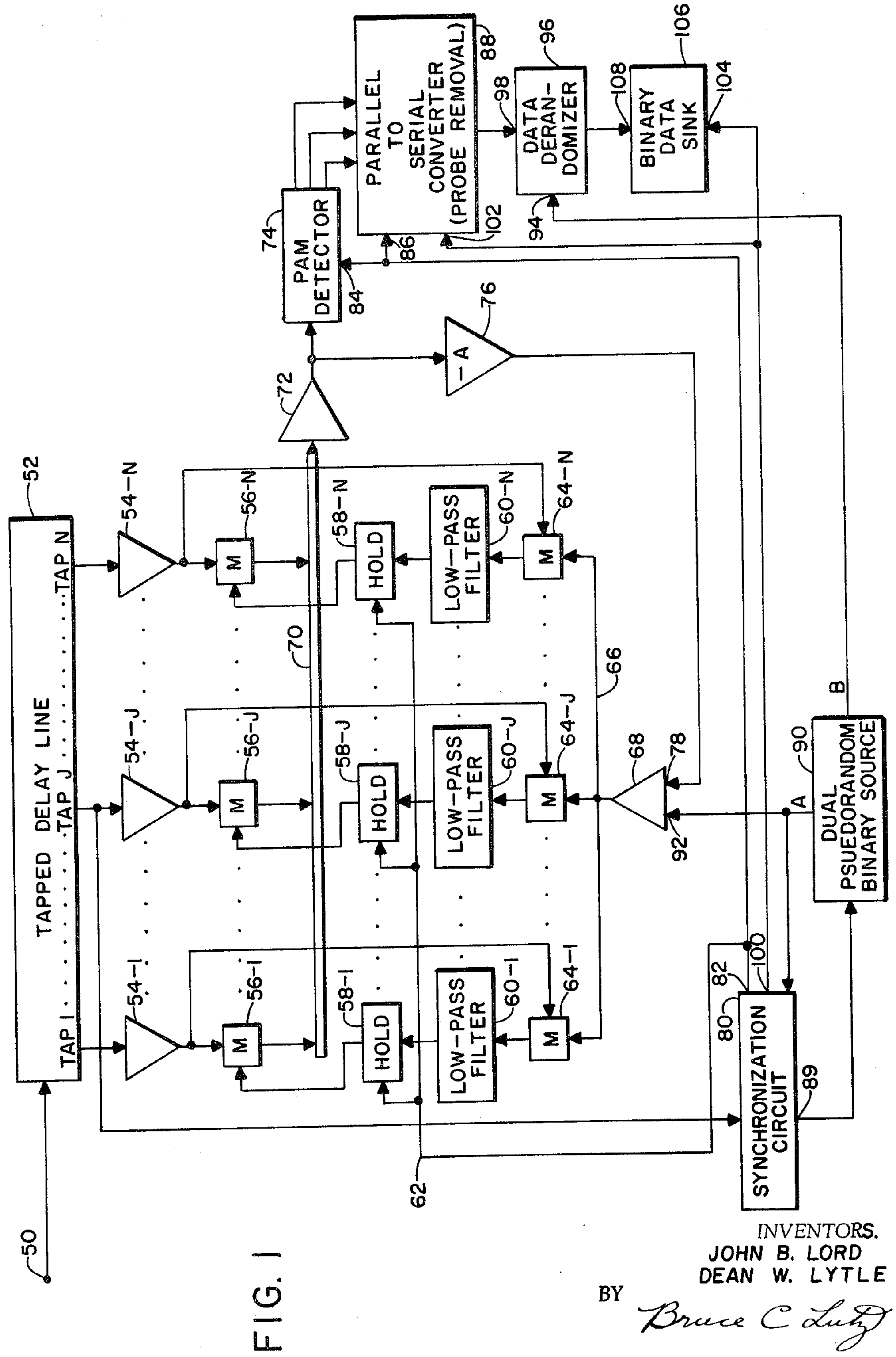
FIGURE 1 illustrates one embodiment of a receiver utilizing the present invention.

Referring now to FIGURE 1, it will be noted that there is an input terminal 50 into a tapped delay line 52. Input 50 is the same as output 42 in FIGURE 2. The tapped delay line 52 has output taps ranging from tap 1 through tap N with an intermediate tap J. These three taps are labeled and dots are shown to indicate many intermediate taps between the three recited taps. A plurality of amplifiers labeled 54–1, 54–J, and 54–N indicate the respective taps to which these are connected. There are as many amplifiers 54 as there are taps. These amplifiers 54 are used for the purpose of impedance matching. Accordingly while they are desirable for some embodiments of the invention, they are not necessary in all embodiments. A first plurality of four-quadrant multipliers 56–1, 56–J and 56–N are also shown connected to the outputs of the amplifiers 54. Again, the multipliers 56 are connected to their respectively indicated taps. Each of the multipliers 56 has an input from an individual hold circuit 58 as represented by the hold circuits 58–1, 58–J, and 58–N. Each of the hold circuits 58 has an input from a low pass filter 60. Each of the hold circuits also has an input from a conductor designated as 62. Each of the low pass filters 60 has an input from a four-quadrant multiplier 64. Each of these multipliers 64 has a common input from a conductor 66 which is attached to an output of a summing amplifier 68. Each of the multipliers 64 also has an input from the respective and corresponding 54 amplifier output. As shown, each tap is connected successively through an amplifier 54, a multiplier 56 to a common resistive summing circuit 70 and then to an input of a summing amplifier 72. Additionally, each of the taps has a corresponding multiplier 64 receiving a common input from an amplifier 68 and providing an output through a low pass filter 60 to a hold circuit 58 and hence to the multiplier 56. The low pass filters represent one form of implementation for the integration or smoothing function required. It is not essential that the smoothing function be performed with low pass filters.

An output of summing amplifier 72 is connected to an A/D converter or PAM (pulse amplitude modulated) detector 74 and also to an inverting amplifier 76. An output of amplifier 76 is connected to a first input 78 of the summing amplifier 68. The tap J is connected directly to a synchronization circuit 80 which has a first output 82 connected to conductor 62 and also to an input 84 of the PAM detector 74. In addition output 82 is connected to an input 86 of a parallel-to-serial converter 88. Converter 88 also receives a set of parallel inputs from the PAM detector 74. Synchronization circuit 80 also has an output 89 connected to a dual pseudo-random binary source 90 which has a first or A output connected to an input 92 of amplifier 68 and has a second or B output connected to an input 94 of a data derandomizer 96. A second input 98 to the data derandomizer 96 is received from the parallel-to-serial converter 88. The input 92 from dual pseudo-random binary source 90 corresponds in characteristics to the input 24 of dual psuedo-random binary source 20 in FIGURE 2. The input 94 provided by dual psuedo-random binary soruce 90 corresponds to input 22 of the dual psuedo-random binary source 20 in FIGURE 2. An output 100 of synchronization circuit 80 is connected to provide an input 102 to the converter 88 and also to provide an input 104 to a binary data sink 106 having a second input 108 for receiving information from the data randomizer 96.

OPERATION

The invention about to be described will operate with any pulse amplitude modulated signal which has an average of zero and is random in nature. The signal actually shown at input 22 to produce the random characteristics is pseudo random but the invention still operates satisfactorily. In FIGURE 2, the blocks 10, 14, 18, 20, 26, and 28 are utilized to produce from a binary data source this pulse amplitude modulated signal with an average of zero and having random characteristics with a predetermined random sign. Obviously, other circuitry could be used to produce this given PAM signal. The signal is then filtered by filter 30 and transmitted through data link 34. The invention requires that the data link 34 use synchronous amplitude modulation and demodulation. Although the invention will equalize data links which are changing with time, synchronous modulation and demodulation is required to prevent rapid fluctuations of the data link 34 due to relative frequency and/or phase drifts of the carrier oscillators. At the output of the data link, the automatic gain control amplifier 40 produces a relatively constant output at terminal 42.

As previously mentioned, terminal 50 of FIGURE 1 corresponds to terminal 42 of FIGURE 2 and provides an input to the tapped delay line 52. The delay line 52 along with the amplifiers 54, the multipliers 56, the summing means 70, and the summing amplifier 72 comprise the equalizing filter and provides an output signal. The measurement section is used to adjust the tapped weights of the equalizing filter. In operation, the multipliers 56 are utilized to produce a weighting function for the outputs of the tapped delay line. The PAM detector 74 produces a digital output to the parallel-to-serial converter. Since the sign bit is ignored in the converter 88, the probe signal, which had been inserted at input 24 in FIGURE 2, is effectively removed from the data signal. This signal is then applied through a data derandomizer to remove the effect of the data randomizer 14 in FIGURE 2, and applied as binary information to the data sink 106. As will be realized, the output from amplifier 72 could be utilized by other circuitry depending upon the type of information required at the data sink.

In the specific invention shown, it is assumed that the information is obtained from the binary data source 10. This binary signal is randomized by applying it to one input of a data randomizer 14 which has a second input from the dual psuedo-random binary source 20. The converter 28 is then used to change the serial information to parallel information. The PAM generator 26 then supplies a pulse amplitude modulated signal to the low pass filter 30. In essence, the generator 26 is merely transforming the digital information to multiple-level analog amplitude information. In parallel with the inputs to the PAM generator from the converter 28 are pseudo random bits from dual pseudo-random binary source 20 at input 24. The signal at input 24 is statistically independent from that supplied to input 22 of the data randomizer 14. The signal at input 24 is utilized to change the polarity of the output from positive to negative in a random fashion such that the average is zero at the output of PAM generator 26. As will be realized, the input 24 is used as the most significant or sign bit and the PAM rate is $R=r/(K+1)$ where the transmitter timing circiut 18 has an output to clock the binary data source and the dual psuedo-random binary source at a rate of $r$ bits per second and where K is the number of bit words into which the randomized data signal from the data randomizer 14 is divided to be applied from the converter 28 to the generator 26, and R is the PAM rate.

The PAM signal is spectrum limited by low pass filter 30. The cut-off frequency for the low pass filter 30 is located at a minimum of one-half R cycles per second, where R is the PAM rate as previously defined. While the characteristics of filter 30 are not critical, it is desirable that the filter skirt be relatively sharp at the cut-off frequency, in order to limit the PAM spectrum outside the essential frequencies. The data link, including the modulator, communications circuit and demodulator must, of course, be adequate to transmit the spectral output of low pass filter 30. The signal is transmitted through data link 34 and is supplied to output 42 of FIGURE 2.

In FIGURE 1, an output is taken from tap J on delay line 52 to provide synchronizing information to synchronization circuit 80. The synchronization circuit is not a part of this invention and is, therefore, not described further. It is based on cross-correlation of the output from tap J with output A from the pseudo-random binary source 90. The operation of the synchronization is fairly obvious to one skilled in the art. However, the synchronization circuit 80 does provide an output on lead 62 to energize the hold circuits at the rate R, which is the rate of transmission of PAM signals. Simultaneously, the inputs 84 and 86 to the PAM detector 74 and converter 88 respectively are energized to allow transmission of the output from summing amplifier 72 through these two units to detect and convert this information pulse. The second synchronizing signal which appears at output 100 of synchronization circuit 80, is used to gate the converter 88 and the binary data sink 106. A third output at 89 is utilized to gate the dual pseudo-random binary source 90. With this gating input, dual pseudo-random binary source 90 will provide essentially the same outputs as is provided by the dual pseudo-random binary source 20 in FIGURE 2.

As previously mentioned, the blocks 52, 54, and 56 comprise an equalizing filter which is automatically adjusted to equalize the data link. The four-quadrant multipliers 56 at each tap are used to provide the proper weighting value. The sum is obtained by using a resistive adder or any other appropriate adding circuit as indicated by summing bus 70 and summing amplifier 72 in the block diagram. As also previously indicated, the measurement section is used to establish the tap weights needed for the equalizing filter. The tap weights needed for multipliers 56 are established by measuring the pulse response of the data link and performing an iterative computation which minimizes the inter-symbol interference in the data output of the equalizing filter. This measurement section comprises in combination the dual pseudo-random binary source 90, the inverting amplifier 76, the summing amplifier 68, the four-quadrant multipliers 64, the low pass filter 60, and the hold circuits 58. While other circuitry could be used to perform this function, essentially the same function would be necessary in the circuitry to adjust the multipliers 56.

It should be realized that the operation of the invention described is merely one series of steps and that in actuality, since the circuit utilizes a feedback technique, the adjustment process is continuous and the apparatus is therefore continually striving to obtain optimum results.

The output of amplifier 72 is inverted through amplifier 76 and is summed in amplifier 68 with the A output from dual pseudo-random binary source 90. The output of this summing amplifier is fed to each of the multipliers 64. Except for the data signal, which is random with an average of zero, the output of this summing amplifier is the error (inter-symbol inference) in the equalized probe signal since the random signal from source 20 has essentially been removed by the signal from generator 90. The output of the summing amplifier 68 is then cross-correlated with the individual tap outputs. This correlation is performed by the four-quadrant multipliers 64 and the integrators or low pass filters 60. As will be noted, each individual tap output is correlated with the total or summed error signal being fed back to these multipliers by the summing amplifier 68. The cross-correlation of the error in the equalized probe signal with the tap output from each of the taps gives the proper tap weight estimate for that tap.

The individual tap weight is adjusted by the signal being applied from the hold circuits 58 to the multipliers 56 until the correlation between the error in the output from summing amplifier 68 and that particular tap output is minimized or zero. This in effect assures that the error in the output cannot be due to a misadjustment of that tap weight. This procedure also assures that the variance of the residual error in the output after all taps are adjusted cannot further be reduced by any other choice of tap weights. The long term average of the output of multipliers 64 must be zero if the equalizing filter is properly adjusted. Integrator 60 has a low frequency passband compared to the data rate. The hold circuit samples and holds the integrator output until such time as a gating signal is received from synchronization circuit 80 to sample and hold a new output. The new weighting value for each tap is then applied from the hold circuit to the multipliers 56.

While the above description has provided enlightenment to a specific embodiment of the invention, the invention broadly speaking is in the use of an algorithm for setting tap weights of an adjustable equalizing filter to compensate for changing data link characteristics.

For the purpose of providing a full disclosure of the invention, the mathematical derivation is included as follows. The derivation will be presented using sampled time. The samples being taken at the PAM (pulse amplitude modulater). A time function may be written as $$\beta_1=\beta(_1\tau)$$

where $\tau$ is the sample interval. The pulse response to the channel is given by the vector $$\beta=(\beta_{-m_2}\ \ldots\ \beta_0\ \ldots\ \beta_{n_2})^+ \qquad (1)$$

where $\beta_0$ is the major peak of the pulse response.

The set of equalizer tap weights is given by the vector $$\alpha=[\alpha-m_1\ \ldots\ \alpha_0\ \ldots\ {}_{n_1}]$$

where $\alpha_{-m_1}$, is the first delay line tap.

The samples of the composite pulse response of the data link plus equalizer is given by $$\nu_1=\sum_{j=-m_1}^{n_1}\alpha_j\beta_{j-i},\ i=-m_1-n_2,\ m_2+n_1 \qquad (3)$$

It is desirable to minimize $\overline{(\nu)^2}$, the mean square valve of $\nu_1$, subject to the constraint that $\nu_0=1$. This means that a set of tap weight, $\alpha$, will be found which will minimize the mean square of the inter-symbol interference.

$$\xi=\overline{(\nu)^2}=\sum_{i=-m_1n_2}^{m_2+n_1}\nu_i\nu_i=\sum_i\sum_{j=-m_1}^{n_1}\alpha_j\beta_{j-i}\sum_{l=m-1}^{n_1}\alpha_l\beta_{l-1}$$

$$=\sum_j\sum_l\alpha_j\alpha_l\sum_j\beta_{j-i}\beta_{l-i}=\sum_j\sum_l\alpha_j\phi_l\alpha \qquad (4)$$

where $\phi_{jl}$ is the sampled autocorrelation function of the data link.

By minimizing $\xi$ subject to the constraint $$\nu_0=\sum_j\alpha_j\beta_j=1$$

Using the Lagrange multiples, $$E=\sum_j\sum_l\alpha_j\phi_j\alpha_{l1}+2\lambda\sum_j\alpha_j\beta_{-j} \qquad (5)$$

which is the quantity to be minimized by choosing the $\alpha$ vector.

Applying the technique of the Calculus of Variations, $$\frac{\partial E}{\partial\alpha_k}=\sum_j\sum_l\delta_{jk}\phi_{jl}\alpha_l+\sum_j\sum_l\alpha_j\phi_{jl}\delta_{lk}+2\lambda\sum_j\delta_{jk}\beta_{-j} \qquad (6)$$

where $$\delta_{jk}=1,\ j=k$$
$$=0,\ j\neq k$$

In reducing the above equation $$\frac{\partial E}{\partial\alpha_k}=2\left[\sum_j\phi_{kj}\alpha_j+\lambda\beta_{-k}\right] \qquad (7)$$

this may be set to zero to obtain the extreme. That is, $$\sum_j\phi_{kj}\alpha_j=-\lambda\beta_{-k} \qquad (8)$$

Solving Equation 8 for each tap weight, $$\Phi\alpha=-\lambda\beta_- \qquad (9)$$

is attained in matrix form where $\Phi$=autocorrelation matrix of the data link $$=\begin{bmatrix}\phi_{00}\phi_{01}\phi_{02}\ \ldots\ \phi_{0(m_1+n_1)}\\ \phi_{10}\phi_{00}\ \ldots\\ \vdots\ \ \vdots\\ \phi_{(m_1+n_1)0}\ \ldots\end{bmatrix}$$

and $$\beta_-=[\beta_{n_1}\ \ldots\ \beta_0\ \ldots\ \beta_{-m_1}]^+$$

Solving Equation 9 for $\lambda$ provides $$\alpha=-\lambda\Phi^{-1}\beta_- \qquad (10)$$

Except for a trivial scaling factor $\lambda$, Equation 10 is the solution for the set of tap weights $\alpha$, which will minimize the mean square of the inter-symbol interference of the composite pulse response of the data link plus equalizer.

Applying the constraint, $\nu_0=1$, it is found that the scalor $$\lambda=-\frac{1}{\beta_-{}^+\Phi^{-1}\beta_-} \qquad (11)$$

The solution for the optimum set of tap weights $\alpha$ is $$\alpha=\frac{\Phi^{-1}\beta_-}{\beta_-{}^+\Phi^{-1}\beta_-} \qquad (12)$$

Iterative solution

The solution of Equation 12 requires the inversion of the matrix $\Phi$. This is not an easy task. Instead an iterative solution will be given to the set of simultaneous equations.

$$\Phi\alpha=-\lambda\beta_- \qquad (13)$$

which are obtained from Equation 10.

Again, $\lambda$ is a scaling constant and its value is unimportant since an AGC can be used to correct its magnitude.

The approach taken is the Gauss-Seidel method.

Assume on the $i^{th}$ iteration the vector $\alpha$ is in some state $\alpha^{(i)}$.

Then an error vector is computed which is $$\epsilon^{(i)}=\Phi^{-1}\alpha^{(i)}-\beta_- \qquad (14)$$

The tap weights are then corrected by $$\alpha^{(i+1)}=\alpha^{(i)}-\Delta\epsilon^{(i)} \qquad (15)$$

where $\Delta$ is a feedback matrix chosen to assure that the solution converges.

It can be seen from "Survey of Numerical Analysis" edited by John Todd, published by McGraw-Hill Company, New York, 1962, page 230, that the solution will converge if $$\frac{\lambda_j}{2}>\Delta>0$$

where $\lambda_j$ is the largest eigenvalue of the matrix $\Phi$. This means that by making $\Delta$ sufficiently small, convergence can be assured.

Performance

The transmitted signal would normally be written as $$X_n=S_nD_n \quad (17)$$

where:

$S_n$=sign sequence
$D_n$=data PAM sequence

However, where the $S_n$ and $D_n$ are random and uncorrelated it is also possible to consider $X_n$ to be given as $$X=S_n+D_n \quad (17a)$$

where $S_n$=sign of $X_n$=Line A probe signal after conversion to PAM.

$D_n$=randomized data signal after conversion to PAM.

The cross-correlation of $S_n$ and $D_n$ is zero.

Equation 17 is consistent with the form of the transmitter given in FIGURE 2.

The data link output $Y_n$ is given by $$Y_n=\sum_{j=-m_2}^{n_2}\beta_jX_{n-j} \quad (18)$$

The system is synchronized so that the tap J output of the block diagram is $Y_n$. It should be noted that the tap weight $\alpha_0$ corresponds to tap J of the block diagram, tap weight $\alpha_{-m1}$, corresponds to tap 1 and tap weight $\alpha_{n1}$ corresponds to tap N.

The equalizer output is given by $$Z_n=\sum_{k=-m_1}^{n_1}\alpha_kY_{n-k}$$
$$=\sum_k\sum_j\alpha_j\beta_jX_{n-k-j} \quad (19)$$

The line A output of the dual pseudo-random binary source in the receiver is $S_n$. Therefore, the output of the sum amplifier 72 or 68 is the feedback path is given by $$W_n=\Delta(S_n-R_n)$$
$$=\Delta(S_n-\sum_k\sum_j\alpha_k\beta_jX_{n-k-j} \quad (20)$$

where $\Delta$ is the gain of the sum amplifier 68.

For tap $(J+e)$, the output of the correlator, the cross-correlation of $W_n$ and the output of tap $(J+e)$ is $$E_e=\sum_nY_{n-e}W_n$$
$$=\Delta\sum_nY_{n-e}(S_h-Z_n) \quad (21)$$

Solving further will show that $$E_e=\Delta\left\{\sum_j\beta_j[R_s^{(e-j)}+C_{SD}^{(e-j)}]\right.$$
$$\left.+\sum_k\sum_l\sum_j\beta_j\beta_l\alpha_kR_x^{(e+l+j+k)}\right\} \quad (22)$$

where $$R_S^{(e-j)}=\sum_nS_nS_{n-e+j}$$

=autocorrelation function of $S_n$ $$C_{SD}^{(e-j)}=\sum_nS_nD_{n-e+j}$$

=cross-correlation function of $S_n$ and $D_n$ $$R_x^{(e+l+k+j)}=\sum_nX_{n-l-e}X_{n-k-j}$$

=autocorrelation function of $X_n$

Due to the properties of pseudo-random patterns $$R_S^{(e-j)}=\delta_{e(-j)}$$
$$R_X^{(e+l+k+j)}=\delta_{(e+l)(j+k)}$$

and $$C_{SD}^{(e-j)}=0$$

Hence, Equation 22 becomes $$E_e=\Delta\left[\beta_{-e}-\sum_k\alpha_k\sum_j\beta_j\beta_{k+j-e}\right]$$
$$=\Delta\left[\beta_{-e}-\sum_k\alpha_k\phi_{ke}\right] \quad (23)$$

In matrix form, Equation 23 becomes $$E=-\Delta[\Phi\alpha-\beta_-] \quad (24)$$

Referring back to Equations 14 and 15, it is seen that this is the proper estimator by which to increment the set of tap weights $\alpha$.

Thus it is shown that the invention provides the proper solution to derive the optimum set of tap weights.

The parameters of the invention must be tailored to fit the general characteristics of the data link with which it is to operate. The PAM rate, R, determines the cutoff frequency of filter 30 and tap spacing of the delay line. The data link, typical, and worse case, pulse response in combination with the number of bits, $K+1$, transmitted per PAM pulse determines the delay line length in most instances.

It has been explained that, while the description presented in FIGURES 1 and 2 show a specific embodiment of the invention, the invention broadly speaking is in the use of an algorithm for setting tap weights of an adjustable equalizing filter to compensate for changing data link characteristics. This algorithm is represented by the matrix formula $$\alpha=\lambda\Phi^{-1}\beta_-$$

where $\alpha$ is the vector representation of the tap weight settings, $\lambda$ is a constant dependent upon the system gain desired, the matrix $\Phi$ has elements which are various values of the sample autocorrelation function of the data link pulse response, $\Phi^{-1}$ is the inverse of that matrix, and $\beta_-$ is a vector whose elements are the sample values of the data link pulse response reversed in time. The remaining discussion shows how implementation of this algorithm can lead to an embodiment such as shown in FIGURE 1.

Figure 3:
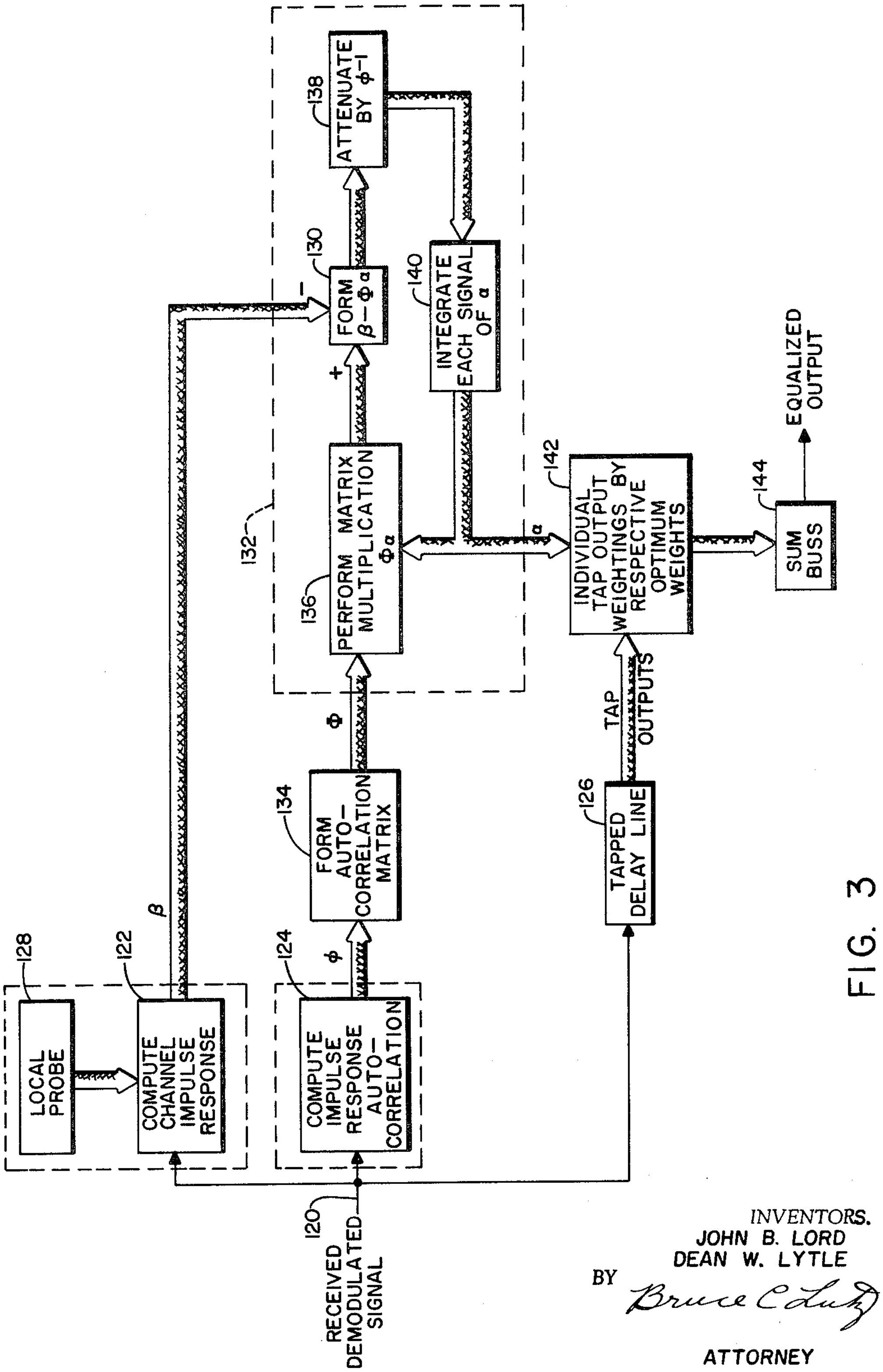
FIGURES 3–8 illustrate the concept of the block diagram of FIGURES 1 and 2 as a mathematical analysis presentation wherein the simplest form of the mathematical analysis is shown in FIGURE 7.

A broad representation of the solution of the formula is given by the block diagram of FIGURE 3 wherein an input signal is received at lead 120 and applied to blocks 122, 124, and 126. Block 122, in conjunction with block 128, computes the channel input response and is more clearly shown in FIGURE 4. Block 124 computes the input response autocorrelation or $\phi$. Block 126 is a tapped delay line as indicated in the figure. A multiple input represented by a cable provides a plurality of probe inputs to block 122 from a local probe generator 128. A set of outputs from block 122 is provided through a cable to a block 130 within dashed lines 132. Block 130 operates to form $\beta-\Phi\alpha$. A set of outputs from block 124 provides a plurality of signals indicating $\phi$ to a block 135 which forms the autocorrelation matrix. Previously mentioned dashed lines 132 encompass the blocks necessary to compute the optimum equalizer tap weights. A block 136 within 132 receives Φ in the form of a plurality of signals from block 134. An output at block 130 provides a plurality of signals to an attenuator 138 which attenuates the signals by $\phi_0^{-1}$. A plurality of signals from block 138 are applied to integrator 140 which integrates each signal of α. Outputs from integrator 140 are applied both to a block 142 and to block 136. Block 136 performs matrix multiplication to provide an output of Φα. Block 142 receives a plurality of signals from tap delay line 126 and provides individual tap output weightings by respective optimum weights. The outputs of block 142 are formed in a summing bus 144 and provide an equalized output. The output from summing bus 144 is represented by the output from amplifier 72 in FIGURE 1.

Figure 4:
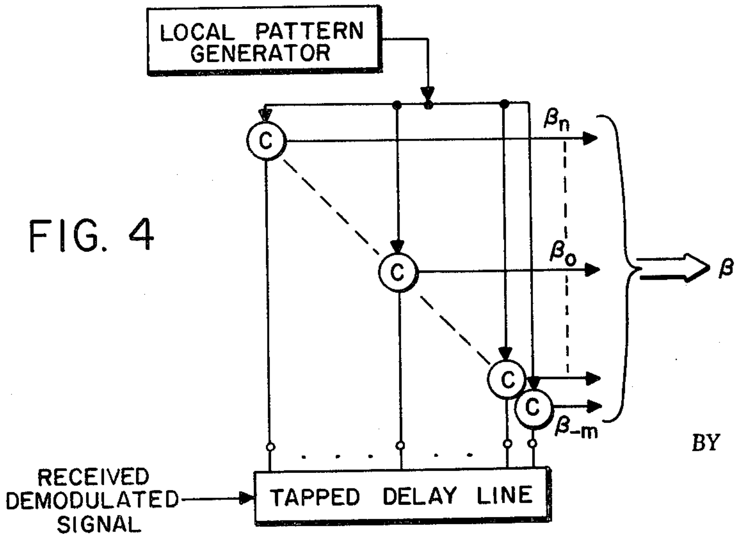

FIGURE 4 is self-explanatory in that it provides a more detailed representation of block 122. The circular symbols enclosing the capital letter C, represent a correlation process or approximation thereto.

Figure 5:
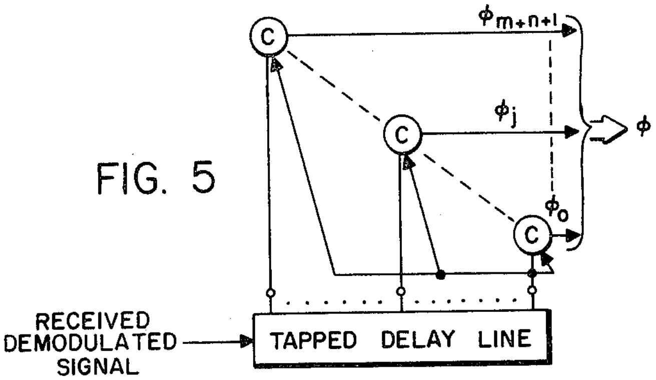

FIGURE 5 is a more detailed representation of a possible implementation of block 124.

Figure 6:
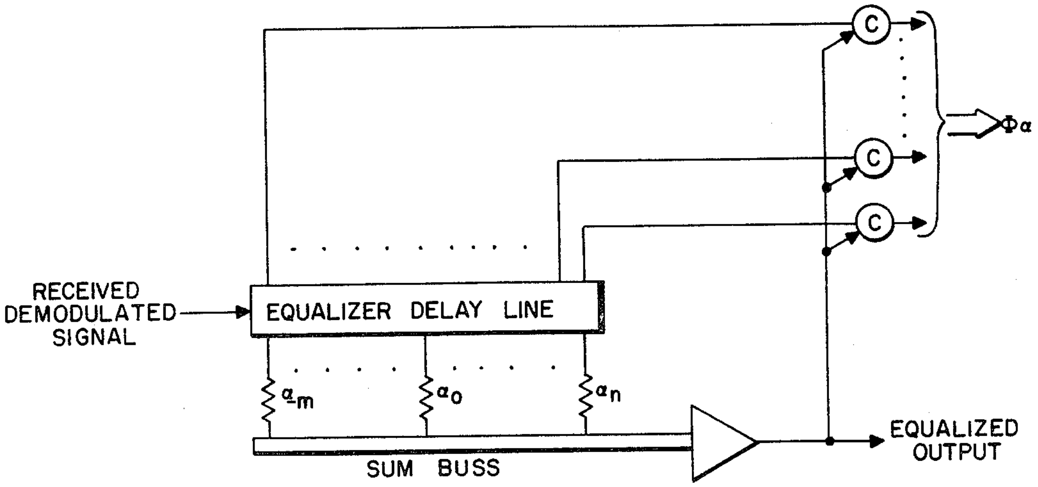

It will be recognized by those skilled in the art, that the implementation of those functions performed in blocks 124, 134, and 136 involve the use of complex and cumbersome hardware. Because of the design chosen for the transmitted signals, an embodiment of which is shown in FIGURE 1, the difficulties can be largely avoided. FIGURE 6 shows an alternate and simplified embodiment for the processes depicted in blocks 124, 134, and 136.

Figure 7:
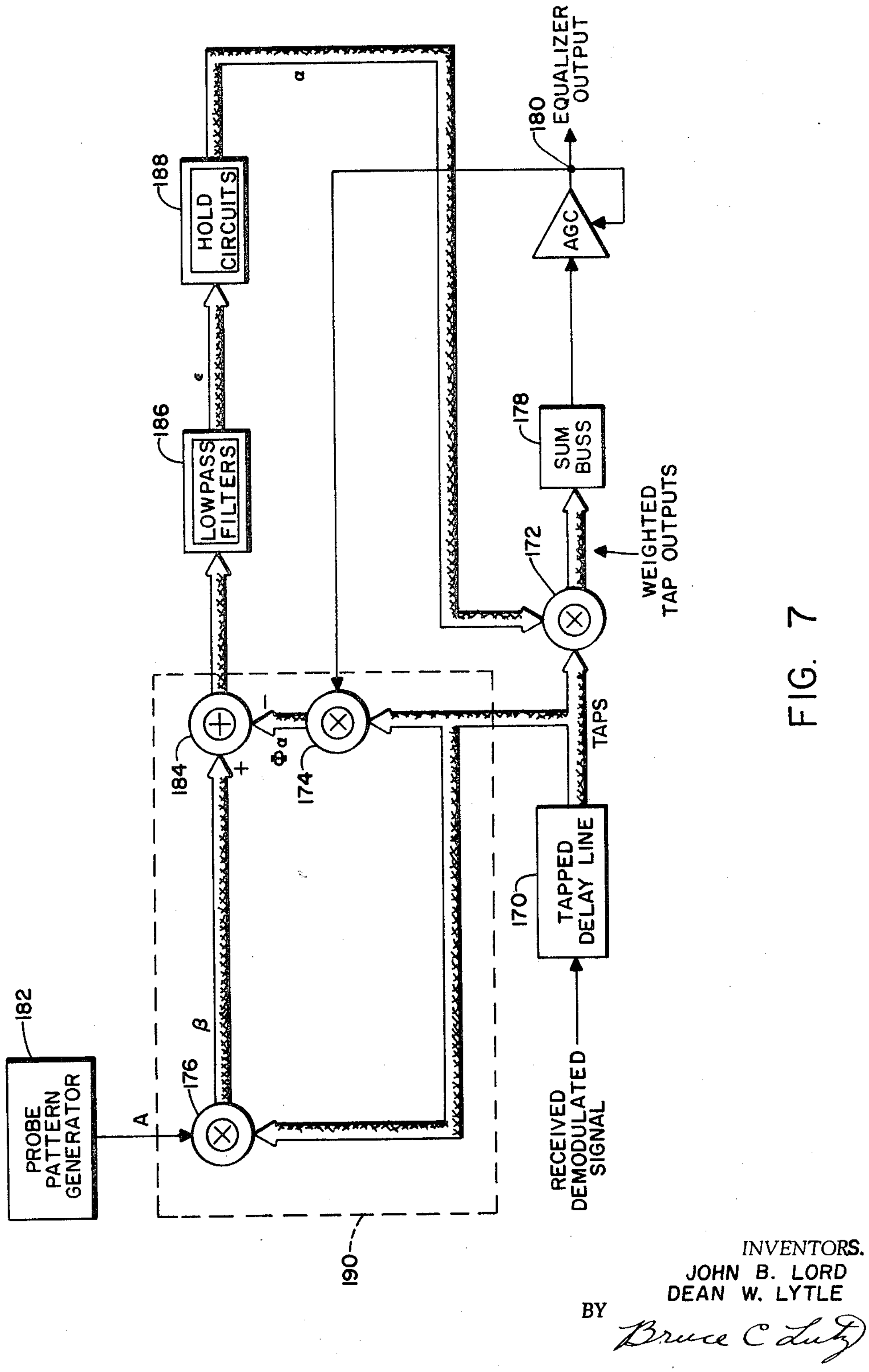

It will be noted that FIGURE 3 as originally connected requires the equivalent of three tapped delay lines; i.e. the one represented directly in FIGURE 3 and the individual ones represented respectively in FIGURES 4 and 6. By observation, it will be noted that FIGURE 3 can be combined with FIGURES 4 and 6 to produce the circuit of FIGURE 7. FIGURE 7 is quite similar to FIGURE 1. An input signal is applied to a tapped delay line 170 whose outputs are applied to multipliers 172, 174, and 176. A plurality of outputs from multiplier 172 is applied to a summing bus 178 and then to an equalizer output 180. The output 180 is fed back to provide a multiple input to multiplier 174. Multiplier 176 receives a multiple signal from a probe pattern generator 182 and provides an output of noisy versions of β to a plurality of summing circuits represented by 184. The outputs of multiplier 174 represent noisy versions β and are also applied to summing circuit 184. The outputs of summing circuits 184 are applied to a plurality of low pass filters 186. The outputs of the low pass filters represent a plurality of signals represented by smoothed versions of ε. The ε signals are applied to a plurality of hold circuits 188. The output of the hold circuits provide signals representative of α, or the optimum tap weights, and are applied to multiplier 172.

Figure 8:
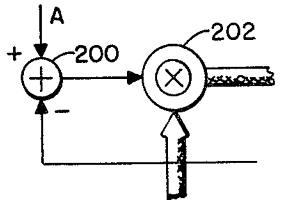

Upon observation, it will be noted that the multipliers 174 and 176 along with summing circuit 184 within dashed lines 190 can be simplified as shown in FIGURE 8 which contains the same inputs and outputs in the same relative position as shown in FIGURE 7. Thus, the output 180 is applied to a summing circuit 200 and the output of summing circuit 200 is applied to a multiplier circuit 202 which also receives a plurality of inputs from the tap delay line 170.

By reference between FIGURES 7 and 8 and FIGURE 1, it will be determined that delay lines 52 and 170 are similar as are summing buses 70 and 178. Also similar, are low pass filters 60 and 186 along with hold circuits 58 and 188. Further, multiplier circuit 172 is similar to multiplier circuit 56 while multiplier circuit 202 is similar to multpliers 64.

While the invention has been shown and described using analogue and mathematical techniques, it is to be realized that the invention can also be constructed using digital circuit techniques and that the invention is to be limited only by the scope of the appended claims. An example of such a conversion from analogue-to-digital techniques in a similar invention may be found in an application 530,515, filed Feb. 28, 1966, in the name of Robert G. Clampham et al. and assigned to the same assignee as the present invention. This application also is concerned with automatic channel equalization.

Among the advantages of the present invention are the ease of removal of the probe signal by merely disregarding the sign bit at the receiver end and the fact that the computation assures the convergence of the proper solution over a wide range of channel distortion. In addition, the alogorithm produces a set of tap weights for the equalizer which produce minimum residual intersymbol interference (i.e., the maximum eye pattern opening, achievable for a given channel distortion and the chosen equalizer delay line length).

While a preferred embodiment of the analogue version of the invention has been shown and described, it is to be realized that changes can be made to the embodiment and still fall within the scope of the invention which comprises the apparatus for, and the method of, equalizing the received signal from a data link by adjusting tap weights on a delay line in accordance with the correlation between the output of the taps and the error signal at the output of the equalizing section of the receiver.

We claim:

1. Communications equipment comprising, in combination:

source means for supplying information signals;

first randomizing means having given randomizing characteristics and connected to said source means for randomizing the polarity of the information signals from said source means;

signal conversion means for transmitting signals through a data link, said transmission means including means for modulating a signal at the transmission end and for demodulating the signal at the receiving end of the data link;

means connecting said first randomizing means to said signal conversion means for supplying thereto the amplitude modulated signal;

automatic gain control means connected to said signal conversion means for receiving a demodulator output signal therefrom;

tapped delay means for providing a transformation of information between input means and parallel output means thereof, said tapped delay means further being connected to receive output signals from said automatic gain control means;

second randomizing means having the same randomizing characteristics as said first randomizing means, said second randomizing means including input means and output means;

first multiplying means connected to said output means of said second randomizing means and to said parallel outputs of said tapped delay means for multiplying the output signal from said second randomizing means times each of the paralel outputs from said tapped delay means, said first multiplying means providing a plurality of parallel output signals;

hold circuit means comprising a plurality of circuits for providing output signals which respond quickly to input signals and decay slowly in the absence of input signals;

means connecting said first multiplying means to said plurality of circuits within said hold circuit means whereby each individual circuit is connected to a separate parallel output of said first multiplying means;

second multiplying means connected to receive signals from said hold circuit means and from said first tapped delay line means whereby each signal from said tapped delay means is multiplied by a corresponding signal from said hold circuit means, said multiplying means providing parallel outputs indicative of the individual multiplications;

summing means for providing a single output signal indicative of the instantaneous summation of all input signals connected to said output means of said multiplying means; and data output means for providing a data output signal, connected to said output means of said summing means and connected to said input means of said second randomizing means for providing feedback information thereto.

2. Automatic channel equalization apparatus for use with a statistically independent, pulse amplitude modulated intelligence signal with an average of zero which has been combined with a probe signal to produce the zero average, which signal has been distorted by transmission through a data channel comprising, in combination:

input means for supplying channel signals;

delay line means, including N taps, connected to receive signals from said input means;

summing means including output means for supplying an output signal therefrom;

N signal amplitude adjusting means connected between said N taps of said delay means and said summing means;

error signal means connected to said output means of said summing means for providing an output signal indicative of the error in the equalized probe signal;

correlation means; and means connecting said correlation means to said N adjusting means and to said error signal means, a signal from said correlation means adjusting the signal to said N adjusting means to provide a minimum error output from said summing means.

3. Apparatus as claimed in claim 2 wherein said error signal means includes means for supplying a detection signal substantially identical to the probe signal used in combination with the intelligence signal to produce the zero average and means for comparing the output signal from said summing means with the detection signal wherein the resultant of the comparison is indicative of the error in the equalized probe signal.

4. In communications equipment, wherein pulse amplitude modulated information having an average of zero and being substantially random in nature is transmitted over a data link having changing charcteristics such that the received signal is distorted, the method of automatically compensating for the changed characteristics comprising the steps of:

delaying the received, distorted signal in a series of steps;

individually adjusting a plurality of output signals, each corresponding to one of the series of steps, according to a plurality of adjusting signals;

summing the adjusted signals to produce a compensated pulse amplitude modulated output signal;

detecting an error signal in said pulse amplitude modulated signal;

individually correlating this error signal with the signal obtained from each of the delayed steps; and applying the adjusting signal obtained from the correlation to adjust the value of the signals to be summed for minimizing the error signal.

5. In combination with a data link having an associated sending end and receiving end:

sending end source means for supplying a pulse amplitude modulated signal having an average of zero and a substantially random characteristic;

receiving end signal responsive adjustable filter means having a plurality of adjustable outputs connected to taps thereon, each of said adjustable outputs being responsive to an individual one of a plurality of control signals;

means connecting said adjustable filter means to receive said pulse amplitude modulated signals;

summing means including a plurality of input means and an output means;

means connecting said plurality of adjustable outputs from said adjustable filter means each to an individual one of said plurality of input means of said summing means;

apparatus output means connected to said output means of said summing means for providing an output signal containing substantially the same information as the signal provided by said source means;

error signal means connected to said output means of said summing means for providing an error signal indicative of the error in said output signal;

correlation means including a plurality of outputs and a plurality of inputs, said correlation means providing a plurality of output signals indicative of optimum apparatus adjustment to compensate for channel distortion induced inter-symbol interference;

means connecting said error signal means to said correlation means for providing a first signal to be correlated;

means connected to each of the plurality of taps on said filter means and to said correlation means for providing a plurality of input signals thereto to be used as a second of said pairs of signals to be correlated; and means connecting said plurality of outputs of said correlation means to said adjustable means of said adjustable filter means for providing control signals thereto at periodic intervals to adjust said filter means toward providing a minimum error signal at said apparatus output means.

6. Appaartus as claimed in claim 5 wherein the sending end source means produces the zero average pulse amplitude modulated signal by combining a random probe pulse signal with an information signal and said receiving means combines the received signal with a random probe signal having the same characteristics as the probe signal at the sending end to produce an error signal representative of unequalized data link distortion.

7. The method of equalizing a data handling system which comprises the steps of:

providing a source of data to be transmitted through a data link;

providing a random signal having prescribed random characteristics;

combining said data and said signal having random characteristics to provide a pulse amplitude modulated signal with an average of zero and essentially random in nature;

transmitting said combined signal through a data link;

receiving said combined signal at the receiving end of said data link;

providing a second source of signal at the receiving end of the data link having the same random characteristics as the random signal at the transmitting end of said data link;

delaying the received signal in a plurality of steps to provide a first plurality of parallel output signals;

adjusting each of the first plurality of output signals in accordance with a second plurality of signals to provide a third plurality of adjusted signals;

summing said third plurality of signals to provide a fourth signal indicative of a properly corrected source signal as an output signal;

comparing said fourth signal with said receiver signal having random characteristics to provide a fifth signal indicative of the comparison;

multiplying said fifth signal by each of said plurality of first signals to produce a sixth plurality of signals;

integrating each of said sixth plurality of signals to provide a seventh plurality of signals; and applying said seventh plurality of signals at predetermined times with respect to the received signal to provide the third plurality of input signals at the adjustment means to provide equalization of the data transferred characteristics of said data link.

8. Apparatus for automatically compensting for changing data link characteristics comprising, in combination:

a source of data which data had been made random with an average of zero before being transmitted through a data link;

equalizing filter means including adjustably weighted signal taps;

means connecting said source to said filter means for supplying data thereto;

summing means connected to said taps, said summing means providing a composite output signal representative of said data before being transmitted; and means connected to said adjustably weighted taps for weighting said taps in accordance with the formula $\alpha = -\lambda\Phi^{-1}\beta_-$ where $\alpha$ is the vector representation of the tap weight settings, $\lambda$ is a constant depending upon the system gain desired, the elements of $\Phi$ are the various values of the sampled channel autocorrelation matrix function of the data link and $\Phi^{-1}$ is the inverse of the channel correlation matrix and $\beta_-$ is a vector whose elements are the sampled values of the data link pulse response reversed in time.

9. The method of automatically compensating for changing data link characteristics using an equalizing filter with adjustably weighted signal taps wherein the tap weights are set in accordance with the formula $$\alpha = -\lambda\Phi^{-1}\beta_-$$

where $\alpha$ is the vector representation of the tap weight settings, $\lambda$ is a constant depending upon the system gain desired, the elements of $\Phi$ are the various values of the sampled autocorrelation function of the data link and $\Phi^{-1}$ is the inverse of the channel correlation matrix and $\beta_-$ is a vector whose elements are the sampled values of the data link pulse response reversed in time.

10. Automatic channel equalizer apparatus comprising, in combination:

data link means having changing characteristics;

data source means connected to said data link means for supplying data thereto to be transmitted therethrough;

equalizing filter means including adjustably weighted signal taps;

means connecting said data link means to said filter means for supplying data thereto;

summing means connected to said taps, said summing means providing a composite output signal representative of said data before being transmitted;

means for supplying a plurality of vector signals $\beta_-$ whose elements are the sampled values of the data link pulse response reversed in time;

means for supplying a plurality of signals representative of $\Phi^{-1}$ wherein the elements of $\Phi$ are the various values of the sampled channel autocorrelation matrix function of the data link and $\Phi^{-1}$ is the inverse of the channel correlation matrix; and combining means connected to said last two mentioned means and to said adjustably weighted taps of said filter means, said combining means applying to said taps signals indicative of the vector product of $\beta_-\Phi^{-1}$.

References Cited

UNITED STATES PATENTS

| | | |
|---|---|---|
| 3,213,196 | 10/1965 | Tuck et al. |
| 3,292,110 | 12/1966 | Becker et al. |
| 3,297,951 | 1/1967 | Blasbalg. |
| 3,321,719 | 5/1967 | Kaenel. |
| 3,335,223 | 8/1967 | Johannesson et al. |
| 3,421,146 | 1/1969 | Zegers et al. |

THOMAS A. ROBINSON, Primary Examiner

U.S. Cl. X.R.

325—42; 328—37; 333—18; 340—146.1, 167